United States Patent
Prendergast et al.

(10) Patent No.: US 9,922,618 B2
(45) Date of Patent: Mar. 20, 2018

(54) SYSTEMS AND METHODS FOR EMBEDDING ANTENNA ARRAY STRUCTURES IN AN INFORMATION HANDLING SYSTEM DISPLAY

(71) Applicant: Dell Products L.P., Round Rock, TX (US)

(72) Inventors: Liam Prendergast, Limerick (IE); Brian O'Loughlin, Limerick (IE); Liam B. Quinn, Austin, TX (US)

(73) Assignee: Dell Products L.P., Round Rock, TX (US)

(*) Notice: Subject to any disclaimer, the term of this patent is extended or adjusted under 35 U.S.C. 154(b) by 38 days.

(21) Appl. No.: 14/260,572

(22) Filed: Apr. 24, 2014

(65) Prior Publication Data

US 2015/0309626 A1 Oct. 29, 2015

(51) Int. Cl.
| | |
|---|---|
| *G09G 5/00* | (2006.01) |
| *G06F 3/041* | (2006.01) |
| *G06F 3/044* | (2006.01) |
| *H01Q 21/06* | (2006.01) |
| *H01Q 1/22* | (2006.01) |

(52) U.S. Cl.
CPC ............ *G09G 5/006* (2013.01); *G06F 3/044* (2013.01); *G06F 3/0412* (2013.01); *G06F 2203/04112* (2013.01); *G09G 2300/04* (2013.01); *G09G 2370/16* (2013.01); *H01Q 1/2283* (2013.01); *H01Q 21/061* (2013.01)

(58) Field of Classification Search
CPC ........ G06F 3/041; G06F 3/0412; G06F 3/046; G06F 3/047; G06F 3/044; G06F 2203/04112; G09G 5/006; G09G 2370/16; G09G 2300/04; H04B 7/0617; H04B 7/0408; H04W 16/28; H04W 16/24; H01Q 1/246; H01Q 1/2283; H01Q 21/061

See application file for complete search history.

(56) References Cited

U.S. PATENT DOCUMENTS

| | | | | |
|---|---|---|---|---|
| 5,710,987 | A * | 1/1998 | Paulick | H01Q 1/242 343/702 |
| 2006/0270472 | A1* | 11/2006 | Chen | H01Q 1/243 455/575.7 |
| 2007/0085749 | A1* | 4/2007 | Liang | H01Q 1/242 343/702 |
| 2007/0241971 | A1* | 10/2007 | Tsujimura | G06F 1/1616 343/702 |

(Continued)

*Primary Examiner* — Temesghen Ghebretinsae
*Assistant Examiner* — Ivelisse Martinez Quiles
(74) *Attorney, Agent, or Firm* — Jackson Walker L.L.P.

(57) ABSTRACT

In accordance with embodiments of the present disclosure, an information handling system may include a processor, a user interface, and a flexible integrated circuit. The user interface may include a user interface comprising a display, a touch sensor overlaid on the display and configured to detect tactile touches on the user interface, a cover overlaid on the touch sensor, and an antenna array comprising a plurality of antennas. The flexible integrated circuit may be configured to couple the antenna array to the processor, the flexible integrated circuit comprising a radio-frequency module for controlling radio-frequency communications to and from the antenna array and a baseband controller for controlling communication of information between the processor and the antenna.

9 Claims, 3 Drawing Sheets

(56) References Cited

U.S. PATENT DOCUMENTS

| | | | |
|---|---|---|---|
| 2011/0084884 A1* | 4/2011 | Kuo | H01Q 1/243 343/702 |
| 2012/0299863 A1* | 11/2012 | Yilmaz | G06K 19/07758 345/174 |
| 2013/0059532 A1* | 3/2013 | Mahanfar | H01Q 1/243 455/41.1 |
| 2013/0229362 A1* | 9/2013 | Liu | G06F 3/041 345/173 |
| 2013/0257817 A1* | 10/2013 | Yliaho | G06F 3/0414 345/173 |
| 2013/0293482 A1* | 11/2013 | Burns | B81B 7/0006 345/173 |
| 2013/0335274 A1* | 12/2013 | Lo | H04M 1/0202 343/700 MS |
| 2014/0073270 A1* | 3/2014 | Chou | G06F 3/0416 455/90.2 |
| 2014/0085151 A1* | 3/2014 | Yang | H01Q 1/243 343/702 |
| 2014/0106684 A1* | 4/2014 | Burns | H01Q 1/243 455/78 |
| 2014/0345594 A1* | 11/2014 | Rhodes | A47J 37/0704 126/25 R |
| 2015/0099474 A1* | 4/2015 | Yarga | H01Q 1/243 455/77 |

\* cited by examiner

SYSTEMS AND METHODS FOR EMBEDDING ANTENNA ARRAY STRUCTURES IN AN INFORMATION HANDLING SYSTEM DISPLAY

TECHNICAL FIELD

The present disclosure relates in general to information handling systems, and more particularly to embedding antenna array structures in an information handling system display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The presence of wireless communication technology (e.g., Wi-Fi, Bluetooth, mobile broadband and other high speed wireless devices, etc.) in information handling systems is becoming increasingly prevalent. An information handling system enabled for wireless communication technology typically employs radio and antenna subsystems for receiving and transmitting wireless electronic signals. To further increase wireless communication capabilities of information handling systems, and in particular mobile computing devices, designers and manufacturers are beginning to implement in information handling systems multi-gigabit speed wireless communications technology, sometimes referred to as "Wireless Gigabit" or "WiGig," operating over the 60-GHz radio-frequency band.

Topologies of the 60-GHz wireless technology often require partitioning of baseband circuitry and radio-frequency/antenna modules. Such radio-frequency/antenna modules are often of a fairly large size due to the arrangement of an X-Y antenna array structure on such modules. At least one or more of such radio-frequency/antenna modules may be needed to implement a 60-GHz module design, and due to distributed architecture and large antenna array sizes, it may become increasingly difficult to integrate such modules in mobile computing devices, particularly as the industry is trending towards ever thinner and lighter-weight form factors.

SUMMARY

In accordance with the teachings of the present disclosure, one or more disadvantages and problems associated with designing an information handling device with capabilities for wireless communication may be reduced or eliminated.

In accordance with embodiments of the present disclosure, an information handling system may include a processor, a user interface, and a flexible integrated circuit. The user interface may include a user interface comprising a display, a touch sensor overlaid on the display and configured to detect tactile touches on the user interface, a cover overlaid on the touch sensor, and an antenna array comprising a plurality of antennas. The flexible integrated circuit may be configured to couple the antenna array to the processor, the flexible integrated circuit comprising a radio-frequency module for controlling radio-frequency communications to and from the antenna array and a baseband controller for controlling communication of information between the processor and the antenna.

In accordance with these and other embodiments, a method for constructing a user interface of an information handling system may include providing a display for the user interface. The method may also include overlaying a touch sensor on the display, the touch sensor configured to detect tactile touches on the user interface. The method may further include overlaying a cover on the touch sensor. The method may additionally include forming an antenna array comprising a plurality of antennas within the user interface. The method may also include coupling a flexible integrated circuit to the antenna array, the flexible integrated circuit comprising a radio-frequency module for controlling radio-frequency communications to and from the antenna array and a baseband controller for controlling communication of information between a processor and the antenna.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
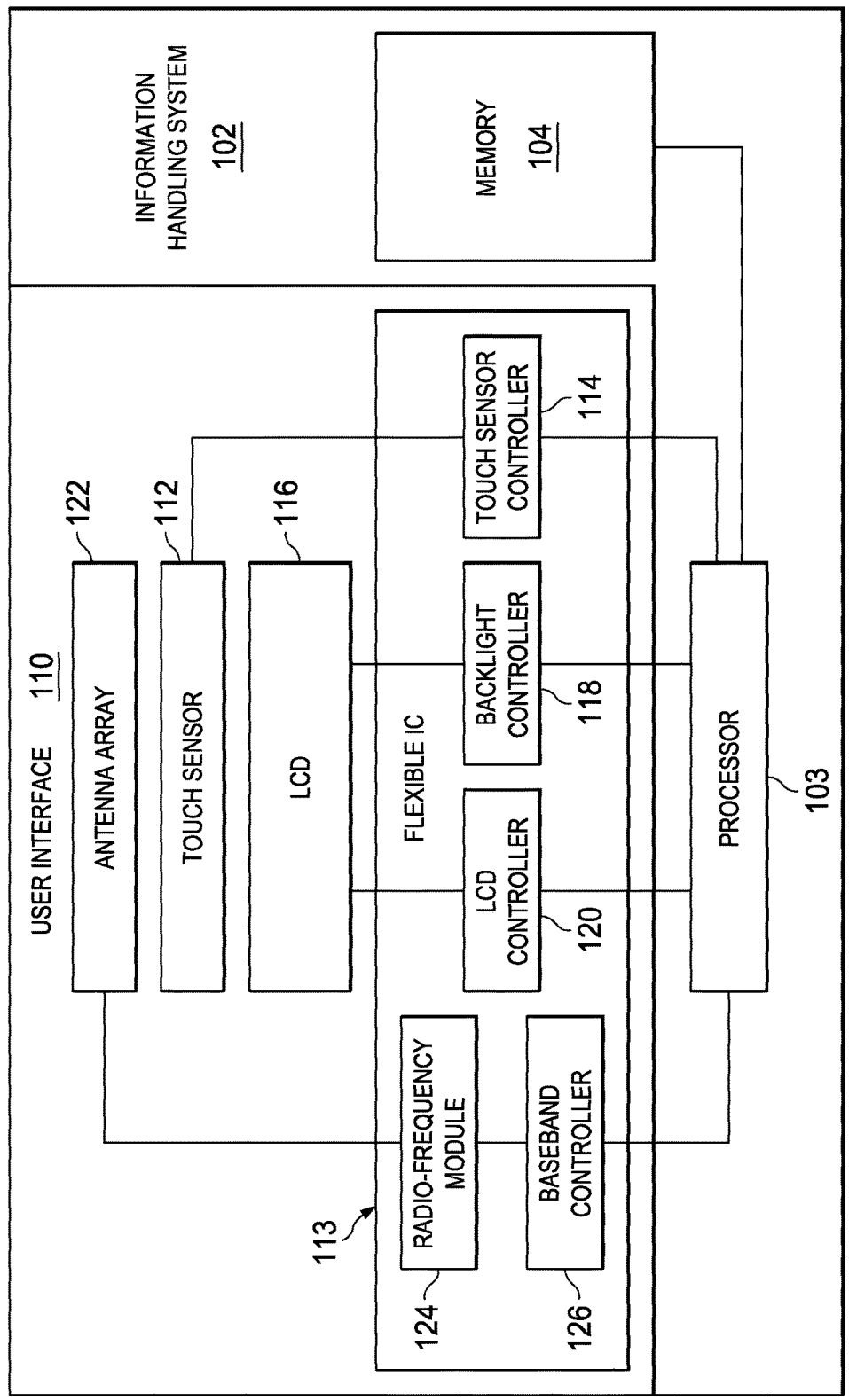
FIG. 1 illustrates a block diagram of an example information handling system, in accordance with certain embodiments of the present disclosure.

Preferred embodiments and their advantages are best understood by reference to FIGS. 1-3B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

FIG. 1 illustrates a block diagram of an example information handling system 102. In some embodiments, information handling system 102 may be a mobile device sized and shaped to be readily transported and carried on a person of a user of information handling system 102 (e.g., a smart phone, a tablet computing device, a handheld computing device, a personal digital assistant, a notebook computer, etc.). As depicted in FIG. 1, information handling system 102 may include a processor 103, a memory 104 communicatively coupled to processor 103, and a user interface 110 coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device. In some embodiments, user interface 110 may comprise a touch-screen display. When implemented as a touch-screen display, user interface 110 may comprise touch sensor 112, a flexible integrated circuit 113, a liquid crystal display (LCD) 116, and an antenna array 122.

As known in the art, a touch sensor 112 may include any system, device, or apparatus configured to detect tactile touches (e.g., by a human finger, a stylus, etc.) on touch sensor 112 and generate one or more signals indicative of the occurrence of such touches and/or the locations of such touches on the touch sensor 112. In some embodiments, touch sensor 112 may be a capacitive touch sensor configured to detect changes in capacitance induced by tactile touches. In these and other embodiments, touch sensor 112 may be constructed from substantially optically transparent material and placed over LCD 116 or another display apparatus, allowing a user to view graphical elements of the touch display while interacting with touch sensor 112.

LCD 116 may comprise any suitable system, device, or apparatus configured to display human-perceptible graphical data and/or alphanumeric data to user interface 110. As is known in the art, LCD 116 may include an array of liquid crystals configured to modulate light generated by a backlight in order to create graphical data and/or alphanumeric data on LCD 116. Although FIG. 1 specifically depicts LCD 116, in some embodiments user interface 110 may include a display device other than an LCD.

Flexible integrated circuit (IC) 113 may include any system, device, or apparatus for assembling electronic circuits by mounting electronic devices on flexible plastic substrates, for example polyimide, polyether ether ketone (PEEK), transparent conductive polyester film, and/or screen-printed silver circuits on polyester. Flexible IC 113 may be manufactured using similar components used for rigid printed circuit boards, allowing the board to conform to a desired shape, or to flex during its use. Flexible IC 113 may be manufactured using photolithographic technology. As shown in FIG. 1, flexible IC 113 may comprise touch sensor controller 114, backlight controller 118, LCD controller 120, radio-frequency module 124, and baseband controller 126. Although FIG. 1 depicts touch sensor controller 114, backlight controller 118, LCD controller 120, radio-frequency module 124, and baseband controller 126 formed on the same flexible IC 113, in some embodiments, such components may be formed on separate integrated circuits, including separate flexible integrated circuits 113. For example, in some embodiments, radio-frequency module 124 may be formed on one flexible IC 113 while touch sensor controller 114, backlight controller 118, and LCD controller 120 may be formed on a different flexible IC 113.

Touch sensor controller 114 may be communicatively coupled between touch sensor 112 and processor 103, and comprise any system, device, or apparatus configured to process signals indicative of touches received from touch sensor 112 and translate such signals into signals which may be processed by processor 103. In addition, touch sensor controller 114 may control one or more operating conditions associated with touch sensor 112, including the rate of sampling touches, whether touch sensor 112 is powered on or enabled, and/or other operating conditions.

Backlight controller 118 may be communicatively coupled between LCD 116 and processor 103, and comprise any system, device, or apparatus configured to control operating of a backlight present in LCD 116, including controlling an intensity of light generated by such backlight.

LCD controller 120 may be communicatively coupled between LCD 116 and processor 103, and comprise any system, device, or apparatus configured to, based on graphical data communicated from processor 103 to LCD controller 120, control individual liquid crystals of LCD 116 in order to modulate the light generated by a backlight, thus creating a display of graphical data and/or alphanumeric data on LCD 116.

Radio-frequency module 124 may be communicatively coupled to antenna array 122 and may include any system, device, or apparatus configured to condition data for transmission from a wireless network interface and/or condition data received by a wireless network interface for processing by baseband processor 126 and/or processor 103. Accordingly, radio frequency module 124 may include, among other things, one or more analog-to-digital converters, one or more digital-to-analog converters, one or more oscillators (e.g., for producing an analog waveform of a particular frequency for modulation or upconversion of an analog signal to a wireless communication signal, or for demodulation or downconversion of a wireless communication signal to an analog signal), one or more upconverters (e.g., to frequency upconvert a baseband analog signal to a wireless communication signal at a radio frequency), and/or one or more downconverters (e.g., to frequency downconvert a wireless communication signal received via antenna array 122 to a baseband analog signal). In addition or alternatively, radio-frequency module 124 may include one or more power amplifiers, impedance tuners, antenna aperture tuners, and/or other components for transmitting or receiving a wireless communication signal.

Baseband processor 126 may be communicatively coupled to processor 103 and radio-frequency module 124 and may include any system, device, or apparatus configured to manage and/or control wireless communication functions of information handling system 102. In addition, baseband processor 126 may also process data to be transmitted from and/or data received by antenna array 122, and thus may serve as an interface between processor 103 and a radio frequency transmit/receive path present in radio-frequency module 124.

Antenna array 122 may be communicatively coupled to radio-frequency module 124 and may comprise any suitable aggregation of a plurality of antennas. Each antenna of antenna array 122 may comprise any system, device, or apparatus configured to convert electric power into radio waves, and vice versa. In some embodiments, information handling system 102 may comprise a plurality of antenna arrays 122 spaced throughout user interface 110 of information handling system 102.

In addition to processor 103, memory 104, and user interface 110, information handling system 102 may include one or more other information handling resources. An information handling resource may include any component system, device or apparatus of an information handling system, including without limitation, a processor (e.g., processor 103), bus, memory (e.g., memory 104), I/O device and/or interface, storage resource (e.g., hard disk drives), network interface, electro-mechanical device (e.g., fan), display, power supply, and/or any portion thereof.

Figure 2:
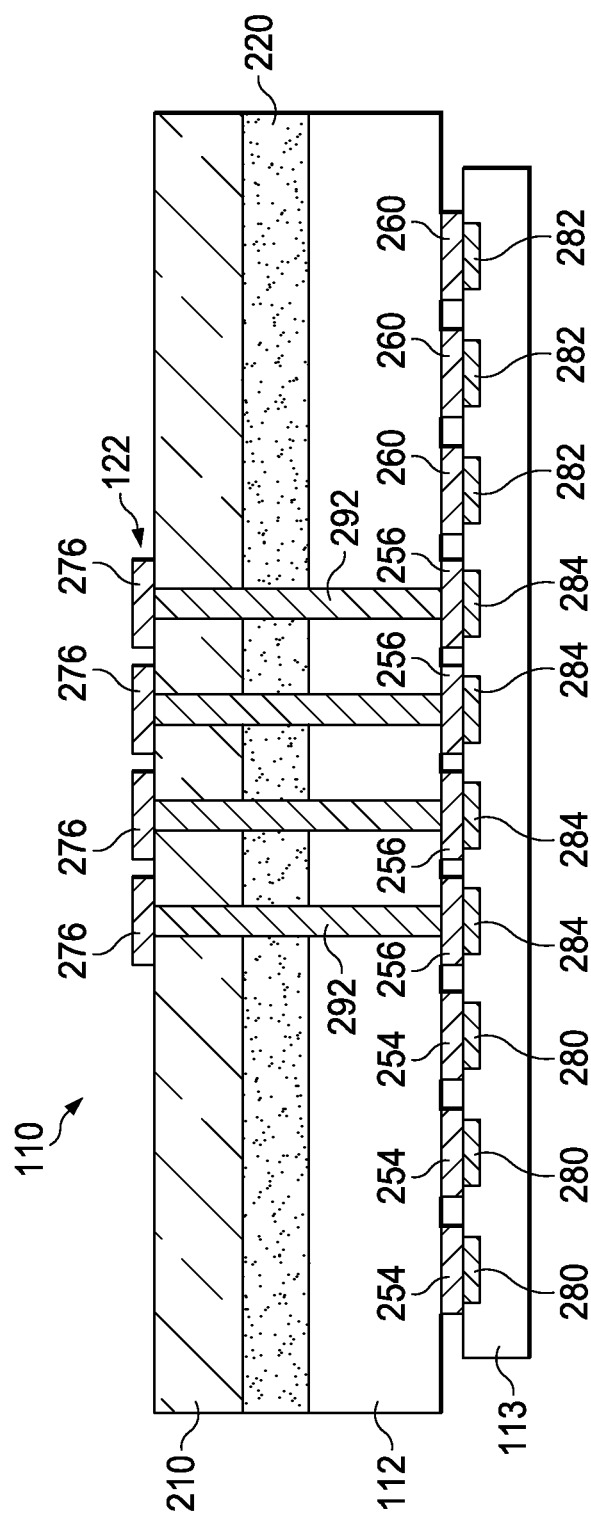
FIG. 2 illustrates an elevation view of selected components of user interface 110, in accordance with embodiments of the present disclosure.

FIG. 2 illustrates an elevation view of selected components of user interface 110, in accordance with embodiments of the present disclosure. As described above, user interface 110 may include touch sensor 112. Coupled to touch sensor 112 may be connection pads 254 and 260. A cover 210 may be coupled to touch sensor 112 via an adhesive 220. A plurality of antennas 276 of antenna array 122 may be formed on cover 210. While FIG. 2 depicts antennas 276 being formed on a top of cover 210, in some embodiments, antennas 276 may be formed on a bottom of cover 210. Coupled to antennas 276 may be vias 292, which may in turn be coupled to connection pads 256. Flexible IC 113 may be electrically coupled to connection pads 254, 256, and 260 via connection pads 280, 282, and 284, respectively. In some embodiments, touch sensor 112 may be configured to detect touches (e.g., capacitively, the touches performed by one or more fingers or a stylus) on cover 210 and produce signals indicative of the detection. Connection pads 260 may be electrically coupled to aspects of touch sensor 112 (such as electrodes) that are aligned in one axis (e.g., the x-axis) and connection pads 254 may be electrically coupled to aspects of touch sensor 112 (such as electrodes) that are aligned in a different axis (e.g., the y-axis). Connection pads 254 and 260 may provide signals to flexible IC 113.

In some embodiments, cover 210 may include material that allows for detection of touches on cover 210. For example, cover 210 may be made of a resilient material suitable for repeated touching such as, e.g., glass, polycarbonate, or poly(methyl methacrylate) (PMMA). Cover 210 may be clear, opaque, or may have one or more levels of suitable opacities.

In some embodiments, adhesive 220 may be formed of Optically Clear Adhesives (OCA). Adhesives that have levels of opacities other than optically clear may be used to implement adhesive 220. Adhesive 220 may be composed of suitable material (or a combination of materials) that effectively attaches touch sensor 112 to cover 210 and flexible IC 113.

In some embodiments, touch sensor 112 may include one or more electrodes that are configured to detect touches on the surface of cover 210. Touch sensor 112 may be a single-sided touch sensor or a double-sided touch sensor, such as a double-sided FLM (fine line metal) touch sensor. For example, touch sensor 112 may be configured such that electrodes aligned in one axis (e.g., the y-axis) may be present on one surface of touch sensor 112 and electrodes aligned in a different axis (e.g., the x-axis) may be present on another surface of touch sensor 112. As another example, touch sensor 112 may be configured such that electrodes aligned in one axis (e.g., the y-axis) may be present on the same surface of touch sensor 112 (e.g., the surface that faces cover 210) as electrodes aligned in a different axis (e.g., the x-axis).

An electrode of touch sensor 112 (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. As an example and not by way of limitation, an electrode may be made of fine lines of metal or other conductive material (such as for example copper, silver, or a copper- or silver-based material) and the fine lines of conductive material may occupy substantially less than 200% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns.

Touch sensor 112 may implement a capacitive form of touch sensing. In a mutual-capacitance implementation, touch sensor 112 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other through the dielectric material separating them. A pulsed or alternating voltage applied to the drive electrode may induce a charge on the sense electrode, and the amount of charge induced may be susceptible to external influence (such as a touch or the proximity of an object). When an object touches or comes within proximity of the capacitive node, a change in capacitance may occur at the capacitive node and a controller may measure the change in capacitance. By measuring changes in capacitance throughout the array, the controller may determine the position of the touch or proximity within the touch-sensitive area(s) of touch sensor 112.

In a self-capacitance implementation, touch sensor 112 may include an array of electrodes of a single type that may each form a capacitive node. When an object touches or comes within proximity of the capacitive node, a change in self-capacitance may occur at the capacitive node and a controller may measure the change in capacitance, for example, as a change in the amount of charge needed to raise the voltage at the capacitive node by a pre-determined amount. As with a mutual-capacitance implementation, by measuring changes in capacitance throughout the array, the controller may determine the position of the touch or proximity within the touch-sensitive area(s) of touch sensor 112. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 112 may have drive electrodes disposed in a pattern on one side of a substrate and sense electrodes disposed in a pattern on another side of the substrate or both the drive electrodes and the sense electrodes may be in patterns on the same side of touch sensor 112 (e.g., when touch sensor 112 is implemented as a single-sided touch sensor). An intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes.

As described above, a change in capacitance at a capacitive node of touch sensor 112 may indicate a touch or proximity input at the position of the capacitive node. A controller may detect and process the change in capacitance to determine the presence and location of the touch or proximity input. The controller may then communicate information about the touch or proximity input to one or more other components (e.g., processor 103), which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In some embodiments, tracks of conductive material disposed on the substrate of touch sensor 112 may couple the drive or sense electrodes of touch sensor 112 to connection pads 254 and 260, also disposed on the substrate of touch sensor 112. Tracks may extend into or around (e.g., at the edges of) the touch-sensitive area(s) of touch sensor 112. Particular tracks may provide drive connections for coupling flexible IC 113 to drive electrodes of touch sensor 112, through which flexible IC 113 may supply drive signals to the drive electrodes. Other tracks may provide sense connections for coupling flexible IC 113 to sense electrodes of touch sensor 112, through which charge at the capacitive nodes of touch sensor 112 may be sensed. Tracks may be made of fine lines of metal or other conductive material.

In some embodiments, connection pads 254, 256, and 260 may be implemented using conductive material, such as copper and may be located along one or more edges of the substrate, outside the touch-sensitive area(s) of touch sensor 112. In some embodiments, connection pads 254, 256, and/or 260 may be implemented as tracks.

Antennas 276 may comprise a thin-film (e.g., less than approximately 1 micrometer) of any suitable material for forming antennas 276.

Although the description above contemplates sensing touch by capacitive sensing, it is understood that other forms of sensing may be used. For example, in some embodiments, touch sensor 112 may be configured to detect heat, and thus may sense touch based on variance in temperature of one portion of touch sensor 112 as compared to another.

Figure 3A:
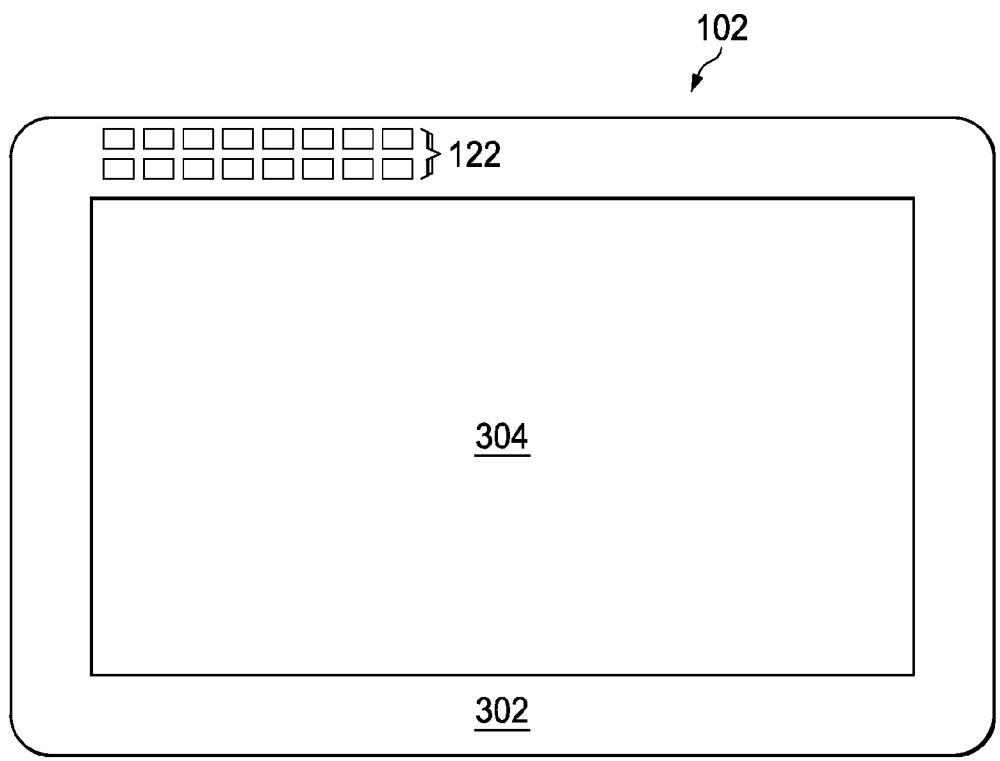
FIGS. 3A and 3B each illustrates a plan view of selected components of the example information handling system of FIG. 1, in accordance with certain embodiments of the present disclosure.
Figure 3B:
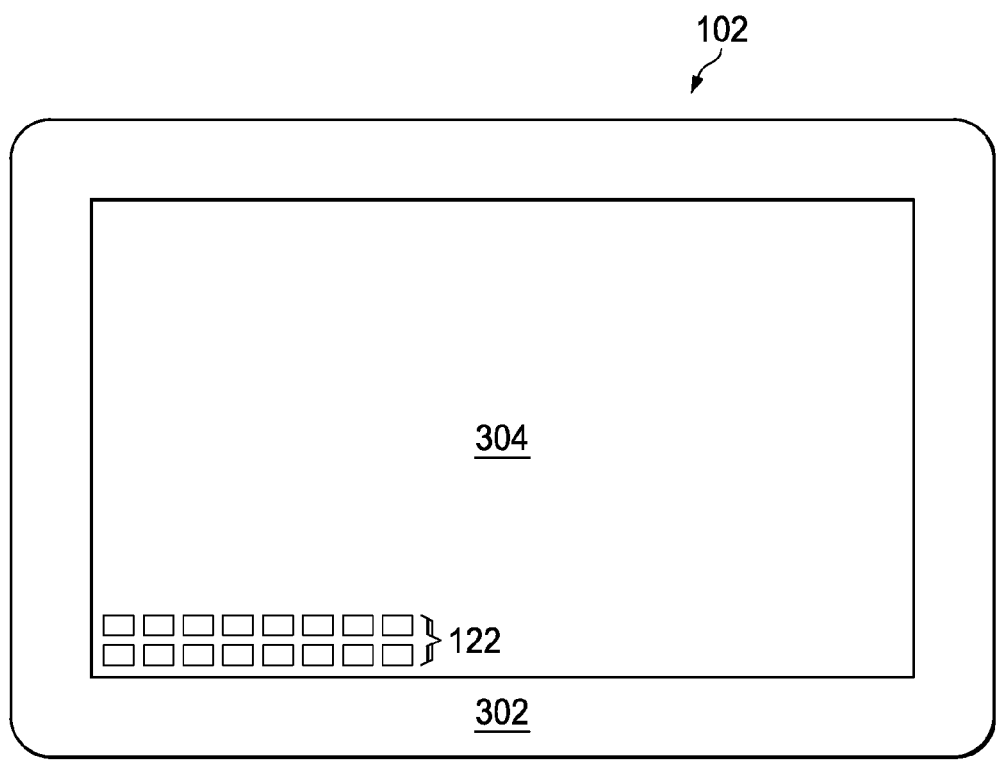

FIGS. 3A and 3B each illustrates a plan view of selected components of the example information handling system 102, in accordance with certain embodiments of the present disclosure. FIG. 3A depicts an example placement of antenna array 122 in an inactive area 302 of user interface 110, as opposed to active area 304 in which touch sensor 112 is active and/or in which graphical information is displayed. Such placement may be appropriate in user interface displays with larger bezels. FIG. 3B depicts an example placement of antenna array 122 in an active viewing area 304 of user interface 110 (e.g., in which touch sensor 112 is active and/or in which graphical information is displayed). In such embodiments, antenna array 122 may be placed under cover 210 or in some embodiments, even under touch sensor 112 (e.g., between touch sensor 112 and flexible IC 113), instead of on top of cover 210, as shown in FIG. 2. In addition, in such embodiments, antenna array 122 may be formed from an optically-transparent material (e.g., indium tin oxide).

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a user interface comprising:
      a liquid crystal display;
      a touch sensor overlaid on the liquid crystal display and configured to detect tactile touches on the user interface;
      a cover overlaid on the touch sensor;
      an antenna array comprising a plurality of antennas formed on an exterior surface of the cover; and
      a flexible integrated circuit underlying the liquid crystal display and the touch sensor, the flexible integrated circuit comprising:
         a radio-frequency module for controlling radio-frequency communications to and from the antenna array; and
         a baseband controller for controlling communication of information between the processor and the antenna array; and
      a plurality of vias configured to couple the antenna array to the flexible integrated circuit, each via of the plurality of vias extending from the flexible integrated circuit, through the liquid crystal display, the touch sensor, and the cover, to one antenna of the plurality of antennas;
   wherein the plurality of antennas and the plurality of vias are located within an active viewing area of the user interface.

2. The information handling system of claim 1, wherein the flexible integrated circuit further includes at least one of: a touch sensor controller, a backlight controller, and a display controller.

3. The information handling system of claim 1, wherein the plurality of antennas are arranged in a plurality of rows and a plurality of evenly spaced columns.

4. The information handling system of claim 3, wherein a number of columns in the plurality of evenly spaced columns exceeds a number of rows in the plurality of rows.

5. A method for constructing a user interface of an information handling system, comprising:
   providing a liquid crystal display for the user interface;
   overlaying a touch sensor on the liquid crystal display, the touch sensor configured to detect tactile touches on the user interface;
   overlaying a cover on the touch sensor;
   forming a plurality of vias within an active viewing area of the user interface, each of the plurality of vias passing through the liquid crystal display, the touch sensor, and the cover;
   forming an antenna array comprising a plurality of antennas on an exterior surface of the cover, wherein each of the plurality of antennas is located within the active viewing area and is in contact with a corresponding via of the plurality of vias; and
   coupling the plurality of vias to a corresponding plurality of connection pads of a flexible integrated circuit, wherein the flexible integrated circuit includes:
      a radio-frequency module for controlling radio-frequency communications to and from the antenna array; and
      a baseband controller for controlling communication of information between a processor and the antenna array.

6. The method of claim 5, further comprising coupling the flexible integrated circuit to a processor.

7. The method of claim 5, wherein the plurality of antennas are arranged in a plurality of rows and a plurality of evenly spaced columns.

8. The method of claim 7, wherein a number of columns in the plurality of evenly spaced columns exceeds a number of rows in the plurality of rows.

9. The method of claim 8, wherein the number of columns exceeds the number of rows by a factor of four.

* * * * *